April 8, 1924.

J. T. BEECHLYN 1,489,419

CHEESE KNIFE AND THE LIKE

Filed Dec. 14, 1921

Inventor,
John T. Beechlyn,
By
Att'y

Patented Apr. 8, 1924.

1,489,419

UNITED STATES PATENT OFFICE.

JOHN T. BEECHLYN, OF LYNN, MASSACHUSETTS.

CHEESE KNIFE AND THE LIKE.

Application filed December 14, 1921. Serial No. 522,369.

*To all whom it may concern:*

Be it known that I, JOHN T. BEECHLYN, a citizen of the United States, residing at Lynn, in the county of Essex and State of Massachusetts, have invented certain new and useful Improvements in Cheese Knives and the like, of which the following is a specification.

The object of my invention is to provide a knife which will have the minimum of friction in cutting through the cheese or other product which ordinarily adheres to the knife blade on account of the relatively large contact or frictional area, and by doing so I am enabled to cut through or draw through cheese or other product with great facility, without carrying along with the knife a portion of such product, or tearing the latter out of the section through which the knife is passing. I am also enabled to cut slices of extraordinary thinness.

Another object of my invention is to provide a knife blade for the purpose hereinabove set forth which will facilitate easy disengagement or separation of the blade from a thin slice which has been parted after cutting, from the main body of the cheese or such product.

The means and manner of operation of my invention will be more clearly understood by referring more particularly to the accompanying specification and drawing, in which Fig. 1 represents in side elevation a knife having a blade of the preferred form of my invention;

Figure 1:
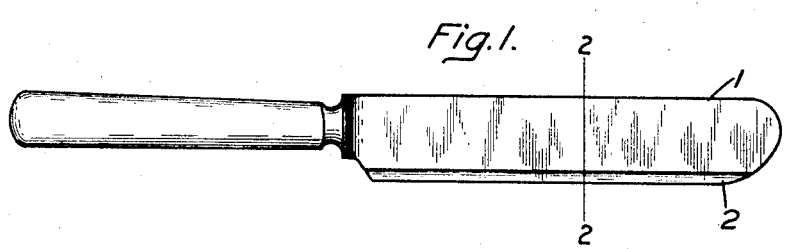
Figure 2:
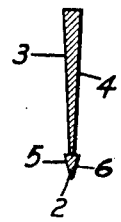
Fig. 2 represents a section of the blade shown in Fig. 1, in double size, the said section being taken on the line 2—2 of Fig. 1.

Referring more particularly to Fig. 1, 1 represents the main body of the knife blade, and 2 a longitudinal rib or web which preferably extends the whole length of the blade and protrudes beyond the surfaces 3 and 4 of the blade, as shown at 5 and 6 of the section Fig. 2. The blade having the section thus described, and illustrated in Fig. 2, may be rolled or manufactured in any other suitable manner.

Thus it will be seen that the effective cutting portion of the blade is reduced in area and depth virtually to that portion shown at 2, in the section Fig. 2, and the frictional contact area is in effect only this portion of the blade and rendering the remaining greater portion of the blade extending above the part 2 ineffective to retard the easy progress of the blade through the cheese or like product while cutting the latter, and obviating the usual tendency of such product to adhere to the knife, especially when thin slices are cut wherein buckling or telescoping of the slice follows.

Figure 3:
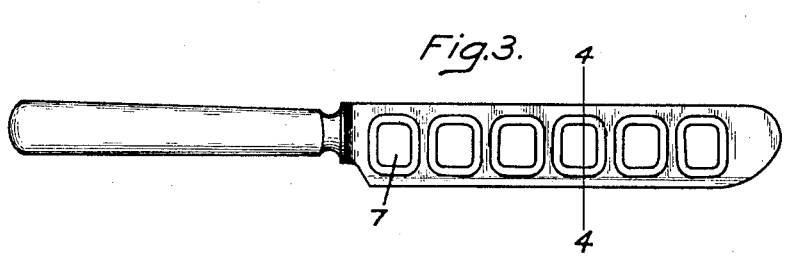
Fig. 3 represents a modification of the invention in which there are a series of openings in the blade to reduce the area of the blade surface exposed to the product to be cut.
Figure 4:
Fig. 4 represents a section on the line 4—4 of Fig. 3, said section being double size.

In the modification Figs. 3 and 4, the same result is secured by making the blade with cut out portions 7 in order to reduce the contact area of the blade with the cheese or like product.

Figure 5:
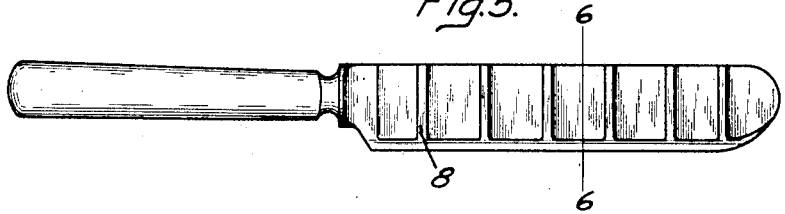
Fig. 5 represents another modification having rib members for reducing the contacting surface area of the blade.
Figure 6:
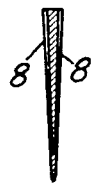
Fig. 6 represents a section of Fig. 5, taken on the line 6—6 of the latter, the section also being double size.

Figs. 5 and 6 also illustrate a modification wherein the contact area is reduced by making the lateral webs or ridges 8 shown.

In accordance with the provisions of the patent statutes, I have described the principle of operation of my invention, together with the device which I now consider to represent the best embodiment thereof, but I desire to have it understood that the device shown is only illustrative and that the invention may be carried out by other means.

What I claim as new and desire to secure by Letters Patent of the United States is:

1. A knife having a cutting blade portion, a reinforcing or guiding portion in surface relief therefrom, the cutting blade having a thickened cross-section with reference to the guiding portion abruptly diminishing towards the bottom of the blade and integral with said guiding portion.

2. A knife for cutting cheese and the like provided with an integral portion having an abruptly receding surface contour near its cutting edge, whereby the contact area of the blade during cutting is confined to the unreceding portion of said blade.

JOHN T. BEECHLYN.